US012584462B2

(12) United States Patent
Stemberg et al.

(10) Patent No.: US 12,584,462 B2
(45) Date of Patent: Mar. 24, 2026

(54) METHOD OF OPTIMIZING A ROTOR BLADE, ROTOR BLADE AND WIND TURBINE

(71) Applicant: Wobben Properties GmbH, Aurich (DE)

(72) Inventors: Jochen Stemberg, Aurich (DE); Janani Kumar, Aurich (DE); Pascal Weihing, Bremen (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 0 days.

(21) Appl. No.: 19/020,020

(22) Filed: Jan. 14, 2025

(65) Prior Publication Data

US 2025/0230800 A1 Jul. 17, 2025

(30) Foreign Application Priority Data

Jan. 16, 2024 (EP) ..................................... 24152197

(51) Int. Cl.
F03D 80/00 (2016.01)
F03D 1/06 (2006.01)
(52) U.S. Cl.
CPC ......... F03D 80/005 (2023.08); F03D 1/0675 (2013.01); F03D 1/0687 (2023.08)

(58) Field of Classification Search
CPC ..... F03D 80/005; F03D 1/0687; F03D 1/0675
See application file for complete search history.

(56) References Cited

U.S. PATENT DOCUMENTS

2012/0134837 A1* 5/2012 Drobietz ............... F03D 1/0633
416/228
2020/0370534 A1* 11/2020 Rubner ................. F03D 1/0675

* cited by examiner

*Primary Examiner* — Sabbir Hasan
(74) *Attorney, Agent, or Firm* — Polsinelli PC

(57) ABSTRACT

The present disclosure relates to a method of optimizing a rotor blade of a wind turbine, wherein said rotor blade extends from a rotor-blade coupling to a rotor-blade tip in a rotor-blade longitudinal direction with a rotor-blade length, having an aerodynamical profile extending between a leading edge and a trailing edge, wherein said method comprises the following steps: designing of said rotor blade for design environmental conditions including at least one design air density, with said designing comprising providing a sound-protection means, the sound protection means comprising at least one bristle, within a blade external region of said rotor blade the latter being defined as the 50% of said rotor-blade length abutting said rotor-blade tip; providing an air density at the installation site of said wind turbine; comparing said air density with said design air density; and increasing the induction factor by increasing a density factor of said sound-protection means when said air density is lower than said design air density.

18 Claims, 5 Drawing Sheets

500

Normalized bristle density factor = 1.0

Unit Span

500

Normalized bristle density factor = 2.0

Unit Span

500

METHOD OF OPTIMIZING A ROTOR BLADE, ROTOR BLADE AND WIND TURBINE

CROSS-REFERENCE TO RELATED APPLICATIONS

This application claims the benefit of priority to European application number 24152197.0, filed on Jan. 16, 2024, which is expressly incorporated by reference herein in its entirety.

TECHNICAL FIELD

The present disclosure relates to a method of optimizing a rotor blade of a wind turbine, to a rotor blade of a rotor of a wind turbine, and to a wind turbine, and a wind farm.

BACKGROUND

Wind turbines have been generally known. The design of the rotor blade(s) is a crucial aspect when it comes to emissions and the efficiency of the wind turbine. The rotor blades of a wind turbine usually have a suction side and a pressure side. The suction side and the pressure side converge along the rotor-blade trailing edge of the rotor blade, in short trailing edge. The pressure difference between the suction side and the pressure side allows for vortexes to be created which may lead to noise emission and power reduction, in particular at the tip of the rotor blade. Further, when there are flows around the blade surface, small vortexes and pressure variations are caused by friction effects at the pressure side and at the suction side which may lead to noise emission when flowing over the rotor blade trailing edge.

Wind turbines and their components, respectively, are designed in line with standardized guidelines (e.g., IEC 61400) which address the essential design requirements to ensure technical integrity of wind turbines. The aim of this standard is to provide an appropriate level of protection against damages from hazards during the planned service life of the wind turbine. Here, standard parameters, which depend on a standardized load but are not site specific, are considered when dimensioning the wind turbine. Among others, the standard parameters are wind shear, occurrence of turbulences, climatic conditions, air density, reference speeds for wind classes and wind zones. As the dimensioning of the rotor blades depends on the standardized load, they have a defined profile with fixed parameters such as profile depth including profile polars, e.g. lift/drag polars, associated therewith. This fixed profile is the basis for calculating load and the annual energy output (AEO).

The design of a wind turbine, and the configuration of the rotor blades resulting therefrom, are mainly based on a standardized site, and a standardized load, respectively, with site-specific proofs/loads possibly being considered. Thereby, the later geometrical configuration of the rotor blades is determined. In particular, the rotor blades have a fixed geometry which cannot be adapted later during manufacturing as regards twist or profile depth.

SUMMARY

Against this background, an object of the present disclosure has been to allow for a site-specific optimization of rotor blades without changing the fixed geometry.

In a first aspect, a method of optimizing a rotor blade of the wind turbine is provided, wherein the rotor blade extends from a rotor blade coupling to a rotor blade tip in a longitudinal direction of the rotor blade with a rotor blade length, having an aerodynamic profile extending between a leading edge and a trailing edge. Thus, it is a basically known rotor blade which can be optimized by the method provided by the present disclosure.

The method comprises the following steps: designing the rotor blade for design environmental conditions which include at least a design air density, wherein designing comprises providing a sound protection means within a blade external region of the rotor blade defined as the 50% of the rotor blade length abutting the rotor blade tip.

The process of designing wind turbines has been well known and described extensively in common textbooks. Given the underlying design conditions, e.g., a design speed and/or a design tip speed ratio, a configuration of the rotor blades is usually desired which is not only as efficient and durable as possible but cost-effective.

The design conditions also comprise design environmental conditions, i.e., conditions modeling the environment at the installation site of the wind turbine under design conditions. Thus, the design environmental conditions are theoretic environmental conditions on which the design is based but which do not necessarily prevail at the proper installation site of the wind turbine. The deviations between design environmental conditions and the environmental conditions prevailing at the installation site of the wind turbine may lead to loss of performance, e.g., Here, air density being lower at an installation site than the design air density is a factor to be considered. For example, the design air density may be a standard air density but also be a different value.

To this end, according to the present disclosure, an air density is provided at the installation site of the wind turbine in a further step. This air density can be determined as an average value or an extreme value or another value representing the air density at the installation site. For example, the air density may be measured, or deduced from meteorological models.

In the further step, the present disclosure provides for comparing the air density with the design air density, and increasing the induction factor by increasing a density factor of said sound-protection means when the air density is lower than the design air density.

Thus, when an air density is obtained at the installation site of the wind turbine that is lower than the design air density, the density factor of the sound-protection means is increased inventively to increase the induction factor and thus the performance.

The underlying finding of the inventors of the present disclosure is based on the density factor of the sound-protection means also increasing the lift produced at the site where the sound-protection means is attached.

A density factor of sound-protection means is a parameter that indicates a ratio of an imaginary rectangular plane with a length of the sound-protection means as length of one side and a length in rotor-blade longitudinal direction of the trailing edge where the sound-protection means are attached as length of the other side that is covered by the sound-protection means.

In other words the density factor indicates how much of this imaginary plane spanned around the sound protection means at the trailing edge of the rotor blade is covered by the sound protection means. In one example, the rest of the imaginary plane is not covered so that air can flow through.

The higher the density factor, the higher the produced lift of the rotor blade, resulting in an improved performance.

When an air density is lower than the design air density, two effects are produced. Firstly, the noise generated is lower, providing for the possibility to make also aero-acoustic trade-offs which lead to higher noise emissions. Moreover, the induction is lower, leading to a lower performance and thus to the wish to increase the performance.

In this case, the increase of the density factor of the sound-protection means allows for a site-based optimization, and in particular for optimizing the performance of the rotor blade, without changing the geometry of the rotor blade.

Sound-protection means may include for example bristles or serrations arranged at the trailing edge of the rotor blade or solid plate add-ons.

There may also be combinations of multiple types of sound-protection means arranged on a rotor blade.

Bristles and serrations are known types of sound-protection means which are arranged at the trailing edge and modify an effective contour of the trailing edge, i.e., a flow-off edge. Thus, the acoustic effects of the air turbulences at the trailing edge of the rotor blade are reduced, and the wind turbine can be operated with a lower noise level.

Bristle are most commonly of cylindrical shape but also cone-shaped bristles or pyramidal-shaped bristles may be considered within the scope of the present disclosure. With bristles, the density factor may be increased by adding additional bristles to the trailing edge or decreasing a gap between the bristles.

The material of the bristles may for example be plastic, carbon, some fibre enhanced material or glass fibre.

Serrations are most commonly shaped triangular but also multi-angle serrations or serrations having concave and/or convex contour may be considered within the scope of the present disclosure. In a triangular shape, the serrations occupy fifty percent of the area beyond the trailing edge, i.e., of the region having the serrated contour. Modifying the edge contour, for instance by shaping the edges convex or by modifying the shape to multi-angle, the share of area covered by the serrations with regard to the total area beyond the trailing edge can be increased, such increasing the density factor and thereby increasing the induction factor.

The density factor may also be adjusted by changing the porosity of the sound-protection means. In order to increase the density factor, the porosity may be decreased.

Porosity or void fraction is a measure of the void (i.e. "empty") spaces in a material, and is a fraction of the volume of voids over the total volume, between 0 and 1, or as a percentage between 0% and 100%. Strictly speaking, some tests measure the "accessible void", the total amount of void space accessible from the surface (cf. closed-cell foam). There are many ways to test porosity in a substance or part, such as industrial CT scanning.

In the context of the present invention, aerodynamic permeability may indicate potential flow through. This would vary between 100% permeable, i.e. virtually no material that blocks the flow, and 0% permeable, i.e. completely dense material that does not allow any flow through. The aerodynamic permeability is determined in an experimental setup in which the mass or volume flow is determined by a test specimen in a closed channel at a given pressure difference. In this case, 100% permeability would be the empty channel and 0% permeability would be the 100% closed channel.

The sound-protection means may be attached to the blade, for example, by laminating, gluing or added to the blades during the manufacturing process of the rotor blade. In specific, brushes and serrations may be laminated or glued to the surface of the rotor blade in one working step.

In one example embodiment, the sound-protection means are configured as a number of bristles, each with a bristle length, a cross section perpendicular to a direction in which the bristles extend with the bristle length and an effective diameter of the cross section, wherein the effective diameter provides the diameter of an imaginary circular cross section having the same cross sectional area, arranged side by side in rotor-blade longitudinal direction and said density factor of said sound-protection means is a normalized bristle density factor based on the number of bristles, the bristle diameter and a unit span, wherein the unit span is the distance in rotor-blade longitudinal direction from the bristle that is closest to the rotor-blade coupling to the bristle that is closest to the rotor-blade tip and a normalized bristle density factor of 1 means that the bristles are arranged gapless next to each other.

It was found that bristles provide a better aero-acoustic performance compared to serrations. In specific, bristles provide a broad band noise reduction without specific peaks, and especially reduce trailing edge noise. Also bristles may change the direction of the emitted noise compared to serrations resulting in a more diffuse emission and an overall reduction noise.

Another advantage over serrations is that bristles are lighter reducing the load on the blade.

Moreover, bristles do not comprise sharp edges that may pose a danger to workers or other person close to the wind turbine.

The normalized bristle density factor is introduced as an indication of aerodynamic permeability and calculated by the following formula:

$$\text{normalized bristle density factor} = \frac{\text{number of bristles} \cdot \text{bristle diameter}}{\text{unit span}}$$

This formula anticipates that each bristle has exactly the same diameter.

However, the present disclosure is not limited to this case. In case, that a bristle set with varying diameter is used, the value "bristle diameter" is replaced by the average value of the diameter of the bristles.

A bristle density factor of 1 means, that the bristles are arranged gapless next to each other. A bristle density factor larger than 1 means, that at least partially, the bristles are arranged in more than one layer.

A layer thereby comprises bristles arranged side by side in rotor-blade longitudinal direction and an additional layer is arranged at a different position between leading edge and trailing edge than a first layer. For example, a second layer of bristles may be attached directly next to the first layer on the surface of the rotor blade. In one example embodiment of multiple layers of bristles, the bristles of the multiple layers are arranged parallel. In case the direction of the bristles of the first layer changes in rotor-blade longitudinal direction, the bristles of additional layers may be attached parallel to the direction of local bristles of the first layer. Local bristles may thereby include the closest two bristles of the first layer.

In case of bristles with a different than circular, noncircular, cross section, an effective diameter can be defined. A noncircular cross section may be a square shaped, multi-angle shaped, rectangular shaped cross section. To define this, the cross sectional area of the noncircular bristle has to be determined. The effective diameter of this bristle is the diameter of an imaginary circular cross section having the same cross sectional area. Regarding the normalized bristle density factor, the "bristle diameter" is then replaced by the effective diameter.

The bristles may also comprise a directional flexibility as a result of the cross section.

In case, that noncircular bristles of different effective diameters are used, an average effective diameter is used instead of the "bristle diameter" in order to calculate the normalized bristle density factor.

For sites with a reduced air density, the normalized bristle density factor can be increased by either increasing the amount of bristles per unit span, or by keeping the amount of bristles per unit span constant but increasing the average value of the bristle diameter or an average value for the effective diameter. In addition, the number of bristles and their diameter can be increased at the same time.

For the case that the bristle density factor varies along the blade span, for example stepwise or sinusoidal variations of the bristle density factor, an average normalized bristle density factor of the rotor blade can be determined and used as a reference. In case of increasing the induction factor, the average normalized bristle density factor is increased.

In one example embodiment, the normalized bristle density factors are in a range between 0.5 and 10. The inventors discovered that for every possible situation occurring at a construction site of the wind turbine, there is a normalized bristle density factor within this range, at which the wind turbine can be operated beneficially.

Another finding of the inventors is that for density-reduced locations it is beneficial to increase the normalized bristle density factor by a factor larger than 1 compared to the designed setup since with this increase a significant performance optimization can be achieved.

A positive effect of increasing the bristle diameter may be an increased bristle stiffness leading to higher effective camber of the airfoil, when aerodynamic load is applied. The bristle diameter may be between 0.3 and 0.5 mm.

Increasing the number of bristles reduces the aerodynamic permeability more effectively.

To reach even more aerodynamic effect, it is beneficial to increase the length of the bristles, so that the effective chord length of the rotor blade is increased.

Another aerodynamic effect can be reached, when the material of the bristles is chosen such that the low density setup of the bristles is stiffer than the normal density setup even when the same diameter of the bristles is used. For this, the fibre density in epoxy of the bristles may be adjusted.

In a further embodiment, the number of bristles comprise a curvature perpendicular to the rotor-blade longitudinal direction. This ensures an optimized air flow and increases the lift. The bristles may be prebend before the attachment to the rotor blade.

The inventors discovered that attaching the bristles with a first angle between the direction in which the bristles extend with the bristle length and a local chord of the rotor blade, the local chord being defined as the direct connection of the leading edge to the trailing edge, being non zero, improves the lift of the blade. The specific value for this first angle may be determined according to local conditions of the construction site of the wind turbine, like for example the air density.

In order to counter a radial force acting on the bristles due to the rotation, the bristles may be attached with an angle different to 90° to the contour of the trailing edge so that the direction in which the bristles extend with the bristle length is non perpendicular to a contour of the trailing edge. This may reduce or eliminate a curvature of the bristles due to the radial force.

Additional improvements in wind turbine operations were observed when the normalized bristle density factor increases in rotor-blade longitudinal direction. The maximum value for the normalized bristle density factor may be reached at the tip of the rotor blade or at the closest bristle to the tip of the rotor blade.

However, the present disclosure is not limited to this distribution of the normalized bristle density factor. It is also possible to optimize the normalized bristle density factor distribution according to local parameters and requirements of the construction site of the wind turbine.

It was also found, that the operation of the wind turbine benefits from a varying diameter of the number of bristles in the direction in which the bristles extend with the bristle length, in specific when the diameter of the number of bristles decreases in the direction in which the bristles extend with the bristle length. The bristles may for example be cone-shaped.

The diameter of the bristles may also vary in rotor-blade longitudinal direction, in specific decrease in longitudinal direction.

In one example embodiment and regarding the structure of the bristles, the bristles consist of a flexible part and an inflexible part. In order to increase the induction factor, the inflexible part of the bristles may be increased. In specific a ratio of inflexible part to flexible part may be increased. In one example, the bristle is attached to the trailing edge of the rotor blade with the inflexible part.

As an additional measure to increase the induction factor, the area in rotor-blade longitudinal direction in which the sound-protection means extend may be increased. In specific, this extend area may be increase in rotor-blade coupling direction This results in an increased lift and thereby optimized performance.

In a further embodiment, the method further comprises the steps of determining the influence of said air density on a propagated sound, and optimizing the performance while considering said air density and a guaranteed sound power level, and, in particular, optimizing the performance by upsizing said sound-protection means.

Optimizing the performance specifically includes maximizing the generated electrical power of the wind turbine. At the same time, the increase in performance must not result in excess sound emissions.

The guaranteed sound power level is a measure that describes the maximum emitted sound power level of the wind turbine. Expressed differently, wind turbine control includes the emitted sound level as a boundary condition when maximizing electrical power, for instance. In some cases the operation of the wind turbine is then limited or restricted by the guaranteed sound power level. This may apply temporarily, for instance during night time or specific wind directions.

As a further example, the installation angle of the sound-protection means could be changed to optimize the power while considering the air density and the guaranteed sound power level.

Usually, lower air densities are associated with lower sound powers so that there is also a "sound in reserve" that may be increased, e.g., by additional power. According to the present disclosure, the additional power is not only achieved by adapting the operation management but first and foremost by increasing the induction in the blade tip region, i.e., by increasing the density factor.

In a further embodiment, the sound-protection means comprise of a first kind (type) of sound-protection means, a number of bristles, and a second kind (type) of sound-protection means other than bristles, for example triangle-shaped serrations, and a share factor indicates the relation of a combined length in rotor-blade longitudinal direction of the areas of the trailing edge where the first kind of sound-protection means are attached to a combined length in rotor-blade longitudinal direction of the areas of the trailing edge where the second kind of sound-protection means are attached and the method comprises the step of increasing the induction factor by adjusting the share factor.

Adjusting the share factor also influences the induction factor since different sound-protection means have different impact on the lift of the blade. It is possible to increase the induction factor by adjusting the share factor and increase the amount of sound-protection means that have a bigger impact on the lift or replace some sound-protection means with other sound-protection means that have higher impact on the lift.

According to a second aspect of the present disclosure a rotor blade of a wind turbine is provided wherein said rotor blade extends from a rotor-blade coupling to a rotor-blade tip in a rotor-blade longitudinal direction with a rotor-blade length, having an aero-dynamical profile extending between a leading edge and a trailing edge, wherein said rotor blade having a sound-protection means within a blade external region which is defined as the 50% of said rotor-blade length abutting said rotor-blade tip, wherein said sound-protection means is configured as a number of bristles, each with a bristle length, a circular cross section perpendicular to a direction in which the bristles extend with the bristle length and a bristle diameter of the cross section, arranged side by side in rotor-blade longitudinal direction, wherein a design normalized bristle density factor is defined for said sound-protection means at which said rotor blade complies with a guaranteed sound power level when it is used at a design air density, wherein the design normalized bristle density factor is based on the number of bristles, the bristle diameter and a unit span, wherein the unit span is the distance in rotor-blade longitudinal direction from the bristle that is closest to the rotor-blade coupling to the bristle that is closest to the rotor-blade tip and a normalized bristle density factor of 1 means that the bristles are arranged gapless next to each other characterized in that a normalized bristle density factor of said rotor blade is larger than said design normalized bristle density factor when said air density is lower than said design air density.

According to a third aspect of the present disclosure, a wind turbine with one or more rotor blades according to the second aspect of the present disclosure is provided.

According to a further aspect of the present disclosure, a wind farm with one or more wind turbines according to the third aspect of the present disclosure is provided.

BRIEF DESCRIPTION OF THE DRAWINGS

In the following, further advantages and preferred embodiments are described with reference to the appended figures. In the figures.

DETAILED DESCRIPTION

Figure 1:
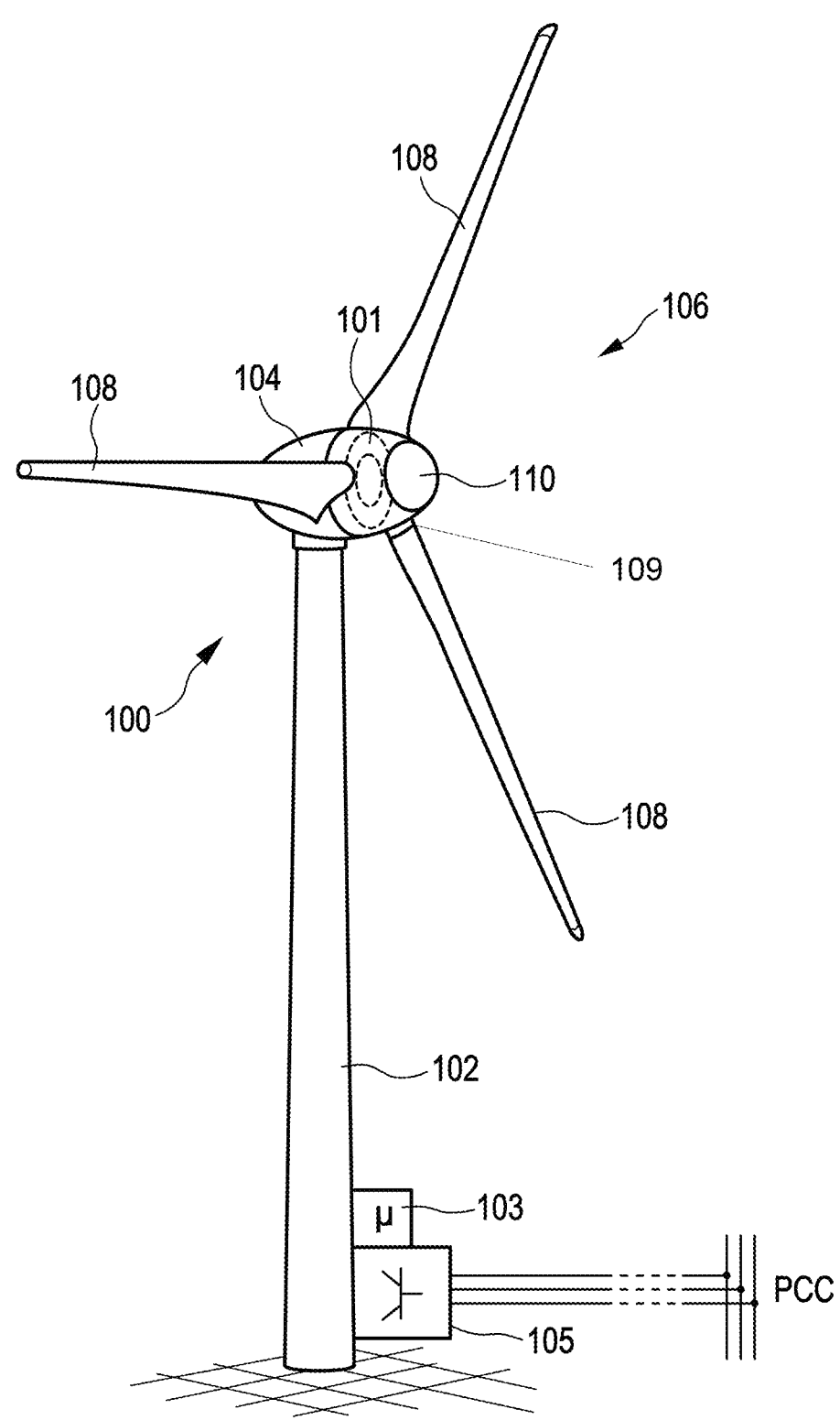
FIG. 1 shows a wind turbine schematically according to some aspects of the present disclosure.

FIG. 1 shows a schematic of a wind turbine according to the present disclosure. The wind turbine 100 has a tower 102 and a nacelle 104 on the tower 102. On the nacelle 104, an aerodynamic rotor 106 is provided which has three rotor blades 108 and a spinner 110. When the wind turbine is operated, the aerodynamic rotor 106 is put into rotational movement by the wind, thus also rotating an electrodynamic rotor, or runner, of a generator which is directly or indirectly coupled to the aerodynamic rotor 106. The electric generator is arranged within the nacelle 104 and produces electric power. The pitch angle of the rotor blades 108 can be changed by pitch motors at the rotor-blade roots 109 of the respective rotor blades 108.

Here, the wind turbine 100 has an electric generator 101 which is indicated in the nacelle 104. Using the generator 101, electric power can be produced. To feed electric power, a feeding unit 105 is provided which, in particular, can be embodied as an inverter. Here, a three-phase feeding current and/or a three-phase feeding voltage can be produced depending on amplitude, frequency, and phase, to be fed to a mains supply point PCC. This can be done directly or in cooperation using further wind turbines in a wind farm. To control the wind turbine 100, and also the feeding unit 105, a turbine control 103 is provided. The turbine control 103 can also obtain default values from the outside, and, in particular, from a central farm computer.

Figure 2:
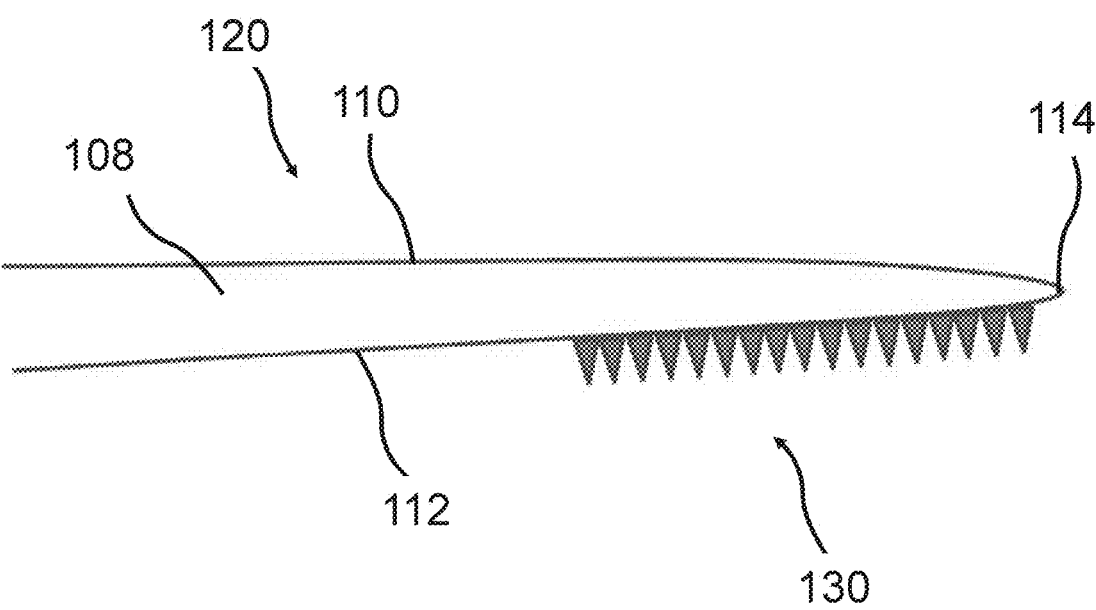
FIGS. 2-6 show a rotor blade with a sound-protection means schematically according to some aspects of the present disclosure.

FIG. 2 shows schematically and exemplarily a blade external region 120 of the rotor blade 108. The blade external region 120 is defined as the outer 50% of the rotor blade 108 which are arranged closer to a blade tip 114, and thus farther away from an axis of rotation of the rotor 106. In the blade external region 120, the rotor blade 108 has a sound-protection means 130 which extends beyond a trailing edge 112. At the trailing edge 112, the suction side and the pressure side of the aerodynamic profile which diverge at a leading edge 110 converge again.

The sound-protection means 130 may be embodied as bristles. In the drawings, the bristles are shown to form a serrated, sawtooth-like contour with alternating tips and notches connected by edges arranged at an angle to the rotor-blade longitudinal direction. Thus, the trailing-edge contour is formed by the bristles in the region of the sound-protection means 130.

However, in other embodiments, the bristles may also be all of the same length such that the contour is linear instead of sawtooth-like as illustrated. The illustrated sawtooth-like contour facilitates the recognition of the sound-protection means compared to the rest of the rotor blade and is thus for illustrative purposes only.

The bristles can inter alia be described by their length, width, cross section and installation angle. The relationship between length and width defines the angle to the rotor-blade longitudinal direction. The installation angle describes the angle of the serration to a chord of the rotor blade at an installation position of the serration, with the chord being the shortest, and most direct, connection between the leading edge and the trailing edge.

While the following description uses bristles as an example of sound-protection means, the same applies to serrations or other known examples of sound-protection means. As described above, also combinations of serrations and bristles, for instance, are advantageous in some embodiments.

The present disclosure relates to the geometric configuration of the rotor blade 108 in the blade external region 120 for optimizing the induction factor with wind turbines 100 at sites with low air density.

By default, bristles are installed in the blade external region 120 for sound reduction. Simulations and experimental studies of the inventors of the present disclosure have shown clearly that the lift at the rotor blade 108, and thus the induction factor, can be increased by extending the bristles and/or increasing the bristle density factor, i.e., the number of bristles per span unit.

By extending the bristles, i.e., by providing larger or more bristles, an effective increase in the local blade depth is achieved, i.e., of the local distance between the leading edge 110 and the trailing edge 112, since the serrations influence the contour of the trailing edge 112. Thereby, the lift-generating surface area is increased.

The air density depends on the temperature and the atmospheric pressure. At sea level, at a temperature of 15° C. and at an atmospheric pressure of 1,013.25 hPa (which is the standard atmosphere) it is 1.225 kg per m³. The air density decreases with altitude. The air density exerts a strong influence on the power of the wind, i.e., the wind power, with a higher air density being associated with higher wind powers, and thus also higher achievable electric powers of the wind turbines 100.

A wind turbine 100 is designed for certain environmental parameters, i.e., during the planning process boundary conditions are defined, e.g., a design air density with respect to which the wind turbine 100 will be optimized later. To achieve the design air density, an optimal operation of the wind turbine is possible, with variations from the design air density usually leading to the scenario that the wind turbine 100 which cannot be operated at the optimal operating site fixed during the planning process.

At the same time, it is not possible to design, and test, an individual wind turbine for each site so that there is a need for wind turbines 100, and in particular rotor blades 108, the application range of which is as broad as possible.

At sites where the air density is significantly lower than the design air density, a reduced induction factor will generally be case when a standard operation management is done. A reduced induction factor means that the wind turbine 100 gathers less energy from the wind and thus, the performance of the wind turbine 100 decreases.

Prior efforts to increase performance focused on adapting the operation management (e.g., increasing the speed and/or decreasing the pitch angle to increase the local angle of attack) to compensate for the induction losses. However, this results in an increase of the service life loads in pivot direction caused by the increased speed, e.g. Further, an increase of the local work angles may lead to flow stalls at the blade (little stall reserve), which might result in higher loads and in noise exposure.

According to the present disclosure, a solution with an upsized sound-protection means, and in particular with extended bristles, is proposed which allows for the induction factor to be adjusted without having to accept higher pivoting loads and smaller stall reserves.

The advantages of the present disclosure described herein reside in that significant power, and thus output, increases can be achieved at sites with reduced density by using bristles which are longer/larger than the design bristles for standardized sites and/or by increasing the bristle density.

Figure 3:
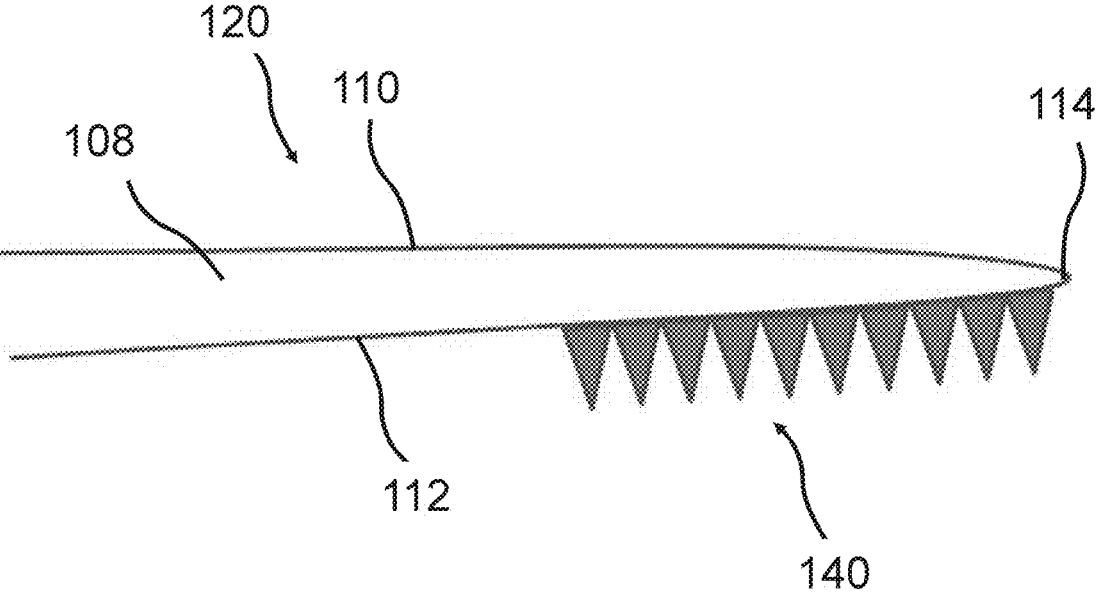

FIG. 3 shows schematically and exemplarily a rotor blade 108 wherein the sound-protection means 130 of FIG. 2 have been replaced with a sound-protection means 140 having geometrically similarly size-scaled bristles. The bristles of the sound-protection means 140 are geometrically scaled, i.e., an aspect ratio of the bristle spikes remains the same from length to width. Thus, the number of spikes is less than with the sound-protection means 130, however, the surface area, and thus the influence on the induction, are higher.

The upsizing of the bristles used may be realized both by a geometrically similar scaling (an aspect ratio of the bristle spikes remains the same from length to width) and by extending the spike geometry without changing the original width (ratio of the serration spikes from length to width becomes larger). In other examples, the upsizing may simply include making some or all of the bristles longer and/or increasing the number of bristles per unit span.

Figure 4:
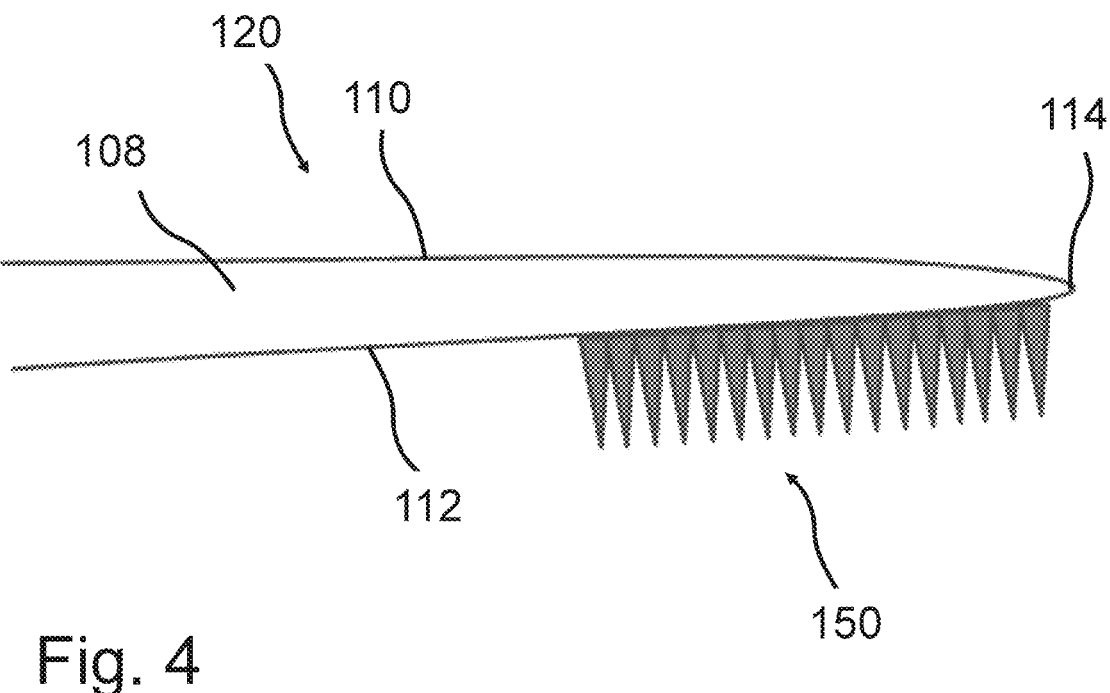

The second alternative of extending the spike geometry without changing the original width can be seen schematically and exemplarily in the sound-protection means 150 of FIG. 4.

In addition to upsizing the bristles, the installation angle can also be adapted (not shown) to further increase lift. The installation angle is the angle between the bristles and the chord of the rotor blade 108. A positive installation angle can be defined towards the pressure side, a negative angle towards the suction side. An adaptation towards the pressure side leads to an increase of the lift because the curvature is increased.

A particular advantage of sites with reduced density is that the wind turbine 100 also propagates less sound when the air density is lower. Thus, an aero-acoustically optimal design of bristles is usually no longer a must at such sites.

Aero-acoustical trade-offs can be accepted in favor of the performance without exceeding the guaranteed sound power levels.

Figure 5:
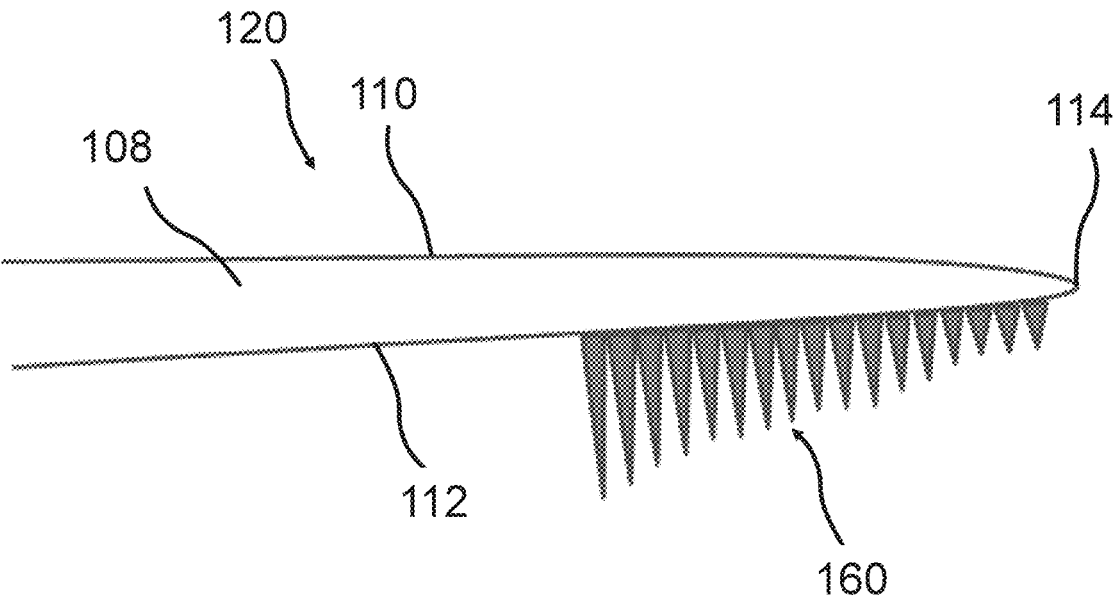

FIG. 5 shows schematically and exemplarily a further embodiment of the sound-protection means 160. The size scaling of the bristles, i.e., the geometrically similar scaling shown in FIG. 3 and/or the scaling of the spike length shown in FIG. 4, does not necessarily have to be the same along the entire radial extension. Rather, depending on the position, also scaling factors differing from the standard density design can be used. For example, in the aero-acoustically important region of the blade tip, a design can be used which is acoustically rather optimal while further inwards at the rotor blade, a bristle scaling can be used which is performance optimized.

This is shown in FIG. 5 wherein almost no upsizing of the sound-protection means 160 has been done at the rotor-blade tip 114, whereas the sound-protection means 160 becomes more upsized with increasing distance to the rotor-blade tip 114.

Figure 6:
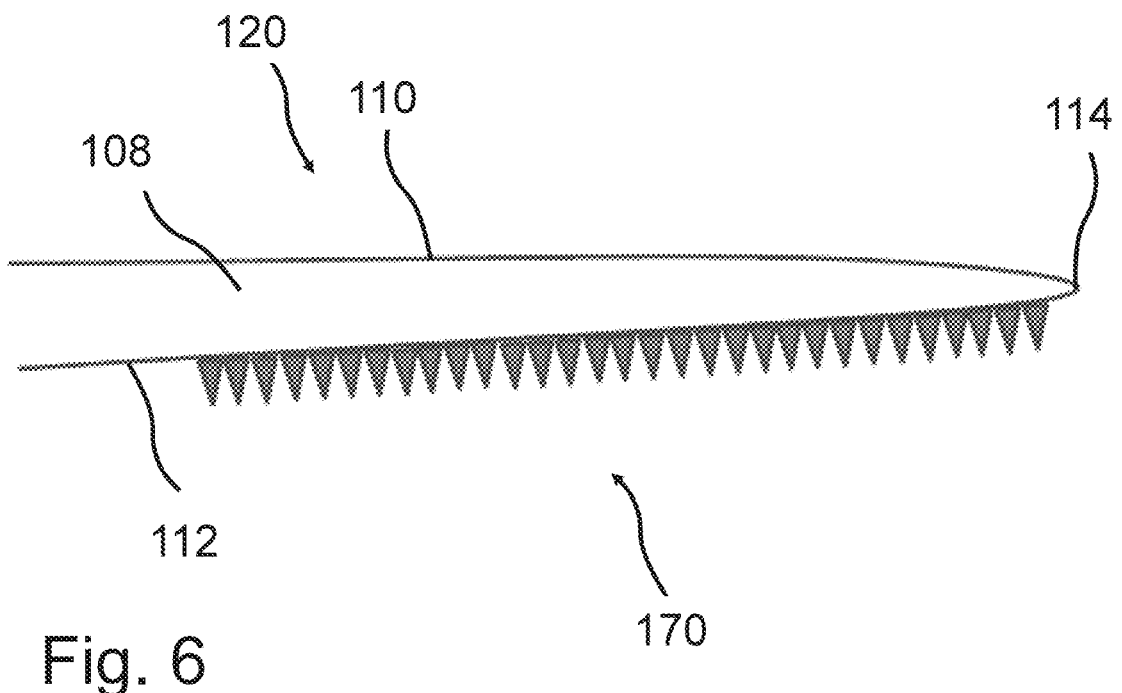

FIG. 6 shows schematically and exemplarily a further embodiment of the sound-protection means 170. A further way to increase the performance at sites with reduced density is to extent also the region in which sound-protection means 170 are to be mounted, e.g., in which further bristles are to be mounted. The additional bristles mounted at the rotor blade further inwards can effectively increase the induction factor in this region.

Of course, the sound-protection means 170 which become more upsized in rotor-blade longitudinal direction can also be site-specifically scaled in size and width, i.e., be combined with the embodiments shown in FIGS. 3, 4 and 5.

11

Figure 7:
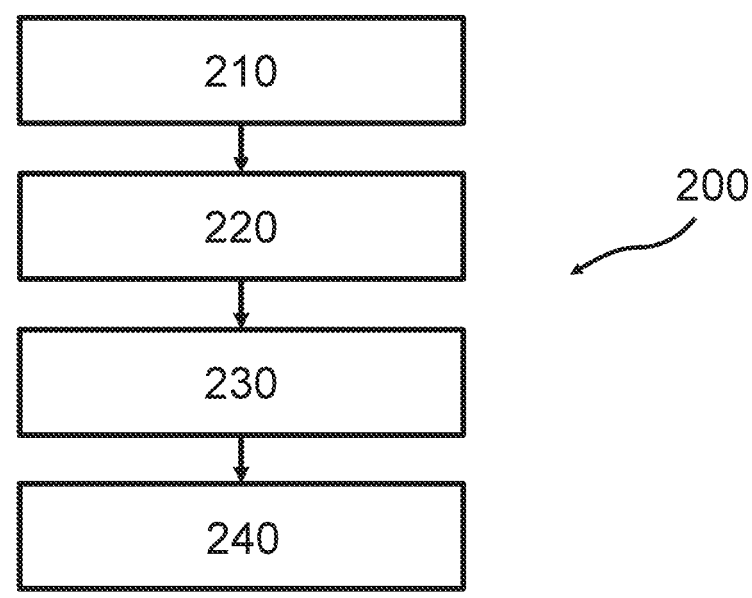
FIG. 7 shows a flow chart of a method schematically according to some aspects of the present disclosure.

FIG. 7 shows schematically and exemplarily a flow of a method 200 of optimizing a rotor blade 108 of a wind turbine 100.

The method 200 comprises a step 210 of designing the rotor blade 108 for design environmental conditions which include at least a design air density, wherein designing comprises providing a sound protection means 130 within a blade external region of the rotor blade defined as the 50% of the rotor blade length abutting the rotor blade tip.

In addition, the method 200 comprises a step 220 of providing an air density at the installation site of the wind turbine 100, and a step 230 of comparing the air density with the design air density.

Finally, the method 200 comprises a step 240 of increasing the induction factor by upsizing the sound-protection means 130, e.g., towards sound-protection means 140, 150, 160 or 170 in case the air density is lower than the design air density.

While the foregoing has been described with reference to air density as an environmental parameter, the same solution, i.e., modifying induction by varying bristles, can be applied to turbulence intensity as the environmental parameter, wherein a larger lift induced by the sound protection means is then used for a lower turbulence intensity.

Figure 8:
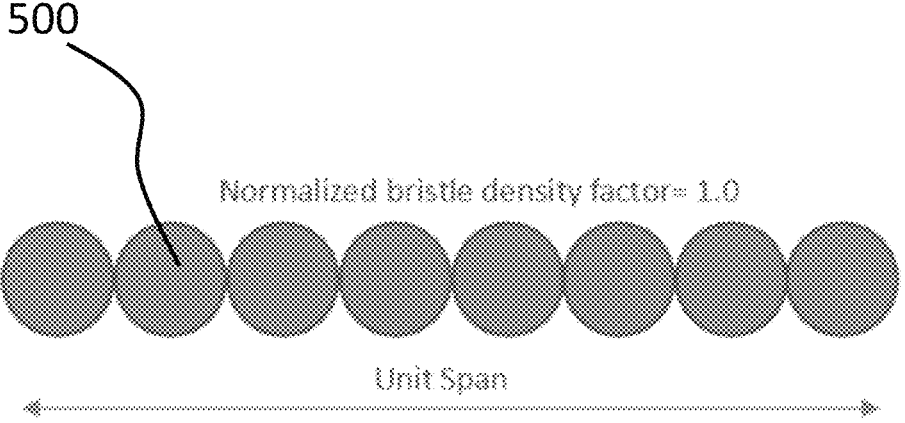
FIG. 8 shows an example of determining a bristle density factor according to some aspects of the present disclosure.
Figure 8:
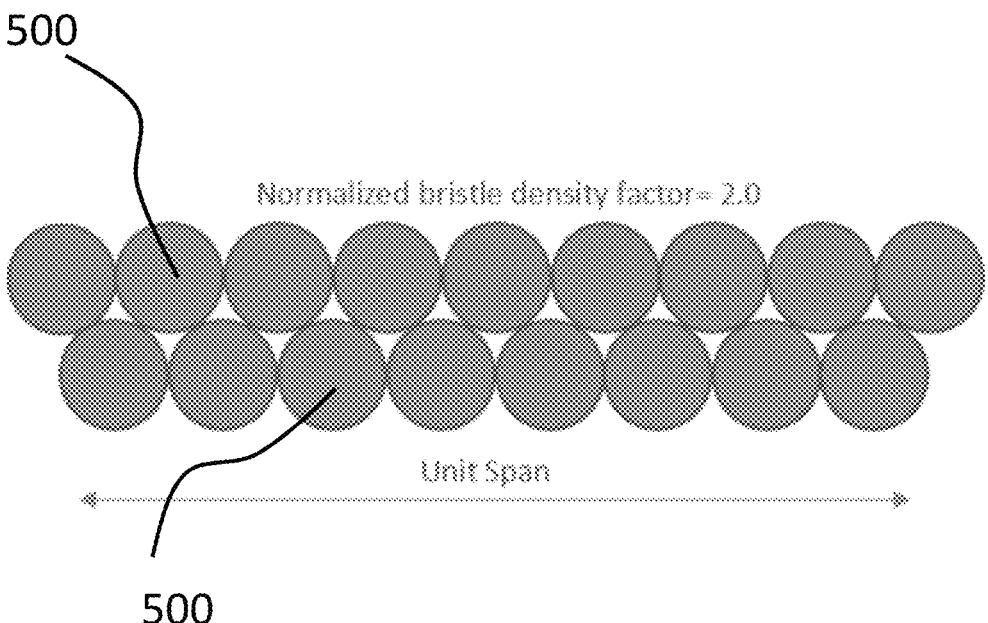

FIG. 8 schematically and exemplarily illustrates two examples of a bristle density factor as described above. In the upper illustration, a bristle density factor of 1.0 is illustrated. This corresponds to plural bristles 500 aligned next to each other in a single row.

By adding a second line of bristles 500 in the thickness direction of the rotor blade, i.e., normal to the indicated span direction and vertical on the image, a bristle density factor of 2.0 is achieved, cf. lower part of the drawing.

The invention claimed is:

1. A method of optimizing a rotor blade of a wind turbine, wherein said rotor blade extends from a rotor-blade coupling to a rotor-blade tip in a rotor-blade longitudinal direction with a rotor-blade length, having an aerodynamical profile extending between a leading edge and a trailing edge, wherein said method comprises:

designing said rotor blade for design environmental conditions including at least one design air density, said designing including providing a sound-protection component, the sound-protection component including at least one bristle, within a blade external region of said rotor blade, the blade external region being defined as 50% of said rotor-blade length abutting said rotor-blade tip;

providing an air density at an installation site of said wind turbine;

comparing said air density with said at least one design air density; and increasing an induction factor by increasing a density factor of said sound-protection component when said air density is lower than said at least one design air density.

2. The method according to claim 1, wherein said sound-protection component is configured as a number of bristles, each bristle having:

a bristle length, a cross section perpendicular to a direction in which the bristles extend with the bristle length, and an effective diameter of the cross section, wherein the effective diameter provides a diameter of an imaginary circular cross section having a same area as the cross sectional,

wherein each bristle is arranged side by side in rotor-blade longitudinal direction, and said density factor of said sound-protection component is a normalized bristle density factor based on one or more of:

the number of bristles, a bristle diameter, and a unit span, wherein the unit span is a distance in rotor-blade longitudinal direction from the bristle that is closest to the rotor-blade coupling to the bristle closest to the rotor-blade tip, and wherein a normalized bristle density factor having a corresponding value of 1 indicates that the bristles are arranged gapless next to each other and every bristle is in contact with at least one other bristle.

3. The method according to claim 2, wherein the normalized bristle density factor having the corresponding value larger than 1 indicates, that at least partially, the number of bristles are arranged in more than one layer, wherein a layer comprises a subset of the bristles arranged side by side in rotor-blade longitudinal direction and the more than one layer is arranged at a different position between a leading edge and a trailing edge than a first layer.

4. The method according to claim 2, wherein the bristle diameter varies among the number of bristles and the normalized bristle density factor is based on an average value of the bristle diameter.

5. The method according to claim 2, wherein the cross section of the bristles perpendicular to a direction in which the bristles extend with the bristle length is circular, and the effective diameter is the diameter of the bristles, wherein noncircular bristles have different effective diameters and the normalized bristle density factor is based on an average of effective diameters of the bristles.

6. The method according to claim 2, further comprising:

increasing the normalized bristle density factor by one or more of:

increasing an amount of bristles per unit span, increasing an average value of the effective diameter, and increasing the normalized bristle density factor by at least 1.

7. The method according to claim 2, wherein the normalized bristle density factor varies along the rotor-blade longitudinal direction and increasing the normalized bristle density factor comprises:

increasing an average normalized bristle density factor.

8. The method according to claim 2, wherein the normalized bristle density factor is between 0.5 and 10.

9. The method according to claim 2, further comprising:

increasing the induction factor by increasing the bristle length when said air density is lower than said design air density.

10. The method according to claim 2, wherein the bristles include a bristle stiffness based on a material the number of bristles are made of, and the method further comprises:

increasing the induction factor by increasing the bristle stiffness when said air density is lower than said design air density, wherein the bristles include a curvature perpendicular to the rotor-blade longitudinal direction.

11. The method according to claim 2, wherein at least one of:

a first angle between the direction in which the bristles extend with the bristle length and a local chord of the rotor blade, the local chord being defined as a direct connection of the leading edge to the trailing edge, is non zero, the direction in which the bristles extend with the bristle length is non perpendicular to a contour of the trailing edge, or the normalized bristle density factor increases in rotor-blade longitudinal direction.

12. The method according to claim 2, wherein the diameter of the bristles varies in the direction in which the bristles extend with the bristle length, or the bristles include a flexible part and an inflexible part, and the method further comprises increasing the induction factor by increasing the inflexible part of the number of bristles.

13. The method according to claim 1, further comprising:

increasing the induction factor by increasing an area in rotor-blade longitudinal direction in which the sound-protection component extend.

14. The method according to claim 1, wherein said sound-protection component comprise of a first type of sound-protection components, a number of bristles, and a second type of sound-protection components other than the bristles, and a share factor indicates a relation of a combined length in rotor-blade longitudinal direction of areas of the trailing edge where the first type of sound-protection components are attached to the combined length in rotor-blade longitudinal direction of the areas of the trailing edge where the second type of sound-protection components are attached and the method further comprises:

increasing the induction factor by adjusting the share factor.

15. A rotor blade of a wind turbine configured to extend from a rotor-blade coupling to a rotor-blade tip in a rotor-blade longitudinal direction with a rotor-blade length, having an aerodynamical profile extending between a leading edge and a trailing edge, the rotor blade comprising:

a sound-protection component within a blade external region which is defined as 50% of said rotor-blade length abutting said rotor-blade tip, wherein said sound-protection component is configured as a number of bristles, each with a corresponding bristle length, a circular cross section perpendicular to a direction in which the bristles extend with the corresponding bristle length and a bristle diameter of the cross section, arranged side by side in a rotor-blade longitudinal direction, wherein a first design normalized bristle density factor is defined for said sound-protection component at which said rotor blade is configured to comply with a guaranteed sound power level when said rotor blade is used at a design air density, wherein the first design normalized bristle density factor is based on the number of bristles, the bristle diameter and a unit span, wherein the unit span is a distance in the rotor-blade longitudinal direction from a bristle that is closest to the rotor-blade coupling to the bristle closest to the rotor-blade tip and a normalized bristle density factor of 1 indicates that the bristles are arranged gapless next to each other, and wherein the rotor blade results from a method according to claim 1 with a second normalized bristle density factor of said rotor blade being larger than the first design normalized bristle density factor when said air density is lower than said design air density.

16. The method according to claim 12, wherein the diameter of the bristles decreases in the direction in which the bristles extend with the bristle length.

17. The method according to claim 1, further comprising:

determining an effect of said air density on a propagated sound; and optimizing performance based on said air density and a guaranteed sound power level.

18. The method according to claim 17, wherein optimizing the performance comprises increasing the density factor.

* * * * *